United States Patent Office 3,226,395
Patented Dec. 28, 1965

3,226,395
WATER-INSOLUBLE PHTHALOCYANINE DYESTUFFS AND PROCESS FOR THEIR MANUFACTURE
Kurt Schimmelschmidt, Frankfurt am Main, Hermann Hoffmann, Bad Homburg, Edwin Baier, Hofheim, Taunus, and Hans Ulmer, Frankfurt am Main, Germany, assignors to Farbwerke Hoechst Aktiengesellschaft vormals Meister Lucius & Brüning, Frankfurt am Main, Germany, a company of Germany
No Drawing. Filed Oct. 3, 1961, Ser. No. 142,515
Claims priority, application Germany, Oct. 4, 1960, F 32,259; Aug. 25, 1961, F 34,770
7 Claims. (Cl. 260—314.5)

The present invention relates to new water-insoluble organic dyestuffs containing mercapto groups which are very suitable, for example, for dyeing cellulose materials and to a process for their manufacture.

We have found that new water-insoluble organic dyestuffs are obtained by heating, at a temperature ranging from about 40° C. to 110° C., water-soluble dyestuffs of the azo or phthalocyanine series which, due to their content of two or several thiosulfuric acid groups, are water-soluble but contain no further groups imparting solubility in water such as sulfonic acid or carboxylic acid groups, in an aqueous solution, if desired in the presence of organic dissolving intermediaries, with non-oxidizing inorganic or organic acids or mixtures thereof. In the course of this reaction the thiosulfuric acid groups are split up and mercapto groups are obtained to a large extent (cf. J. Am. Chem. Soc. 72, 1687 (1950)).

The water-insoluble dyestuffs obtained by the process of this invention are soluble in dilute alkali liquors, this solubility persisting surprisingly even after drying for a considerable time at elevated temperatures although it is known in the art that, under these conditions, the mercaptans are very readily dehydrated to alkali-insoluble disulfides.

In the water-soluble organic dyestuffs used as starting compounds and containing more than 2, preferably 3 to 4 thiosulfuric acid groups, the thiosulfuric groups can be bound directly to an aromatic nucleus of the dyestuff molecule or they can be bound to the dyestuff molecule via hydrocarbon intermediates which may contain one or several heteroatoms.

The following dyestuffs are used, for example:

$$F\!-\!\!\left(CH_2\!-\!SSO_3H\right)_n$$

$$F\!-\!\!\left(CO\!-\!NH\!-\!CH_2\!-\!CH_2\!-\!SSO_3H\right)_n$$

$$F\!-\!\!\left(SO_2\!-\!NH\!-\!CH_2\!-\!CH_2\!-\!SSO_3H\right)_n$$

$$F\!-\!\!\left(SO_2\!-\!NH\!-\!CH\!-\!CH_2\!-\!SSO_3H\atop \quad\ CH_3\right)_n$$

$$F\!-\!\!\left(SO_2N(CH_3)\!-\!CH_2\!-\!CH_2\!-\!SSO_3H\right)_n$$

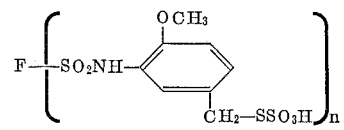

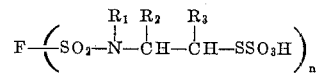

$$F\!-\!\!\left(SO_2NH\!-\!\!\bigcirc\!\!-\!OCH_2\!-\!CH_2\!-\!SSO_3H\right)_n$$

$$F\!-\!\!\left(SO_2NH\!-\!\!\bigcirc\!\!-\!CO\!-\!NH\!-\!CH_2\!-\!CH_2\!-\!SSO_3H\right)_n$$

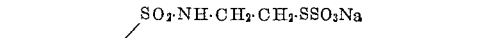

in which F represents the radical of an azo- or phthalocyanine-dyestuff molecule and $n$ stands for an integer from 2 to 4.

Especially advantageous results are obtained by using water-insoluble dyestuffs prepared from water-soluble dyestuffs having the following general formula $$F\!-\!\!\left(SO_2\!-\!\underset{R_1}{N}\!-\!\underset{R_2}{CH}\!-\!\underset{R_3}{CH}\!-\!SSO_3H\right)_n$$

in which F represents the radical of an azo- or phthalocyanine-dyestuff molecule, $n$ stands for an integer from 2 to 4 and $R_1$, $R_2$ and $R_3$ represent a hydrogen atom or an alkyl group containing 2 to 4 carbon atoms.

The following water-soluble dyestuffs used as starting compounds for the process of the present invention are given by way of example (in the form of their salts), this enumeration being not intended to limit the present invention

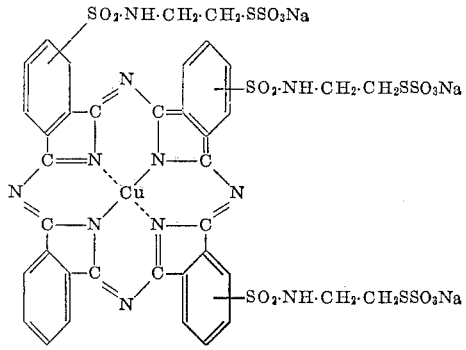

blue

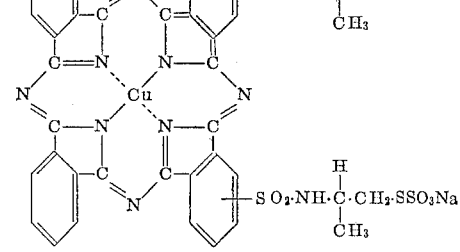

blue

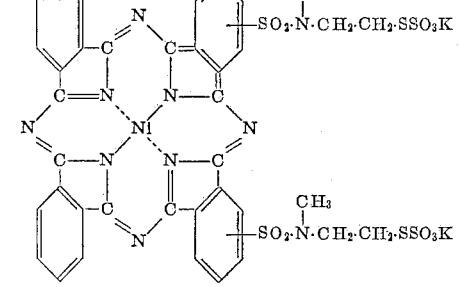

blue

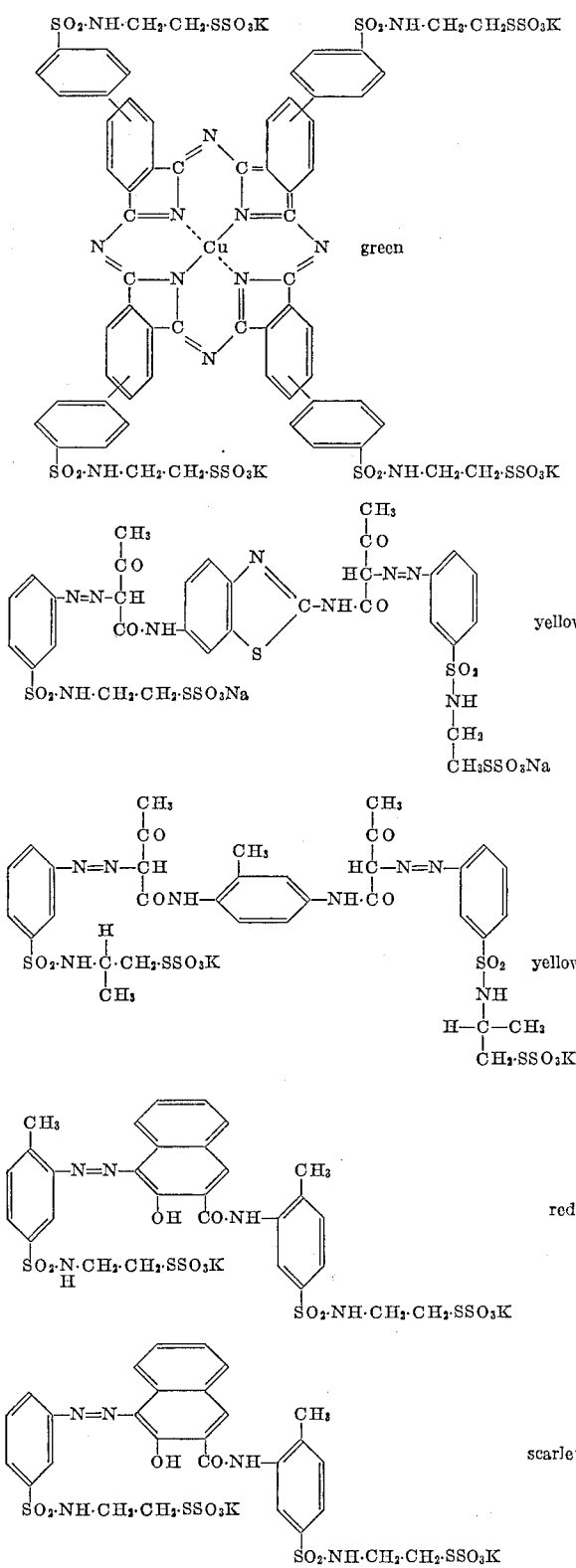

These dyestuffs used as starting compounds can be prepared, for example according to the process described in U.S. patent application Ser. No. 22,719, filed April 18, 1960, by condensing dyestuffs or dyestuff intermediates containing reactive halogen atoms with aminoalkylthiosulfuric acids or aminoaralkylthiosulfuric acids or with the salts thereof in which the thiosulfuric acid group is bound aliphatically.

In case an azo dyestuff is used as starting compound this dyestuff can also be prepared according to the process described in U.S. Patent 3,090,064 by reacting diazo components containing aliphatically bound thiosulfuric acid groups with coupling components which may equally contain thiosulfuric acid groups.

The dyestuffs containing thiosulfuric acid groups are converted into the water-insoluble dyestuffs by heating, at a temperature ranging from about 40° C. to 110° C., advantageously at boiling temperature, the starting dyestuffs diluted in water in the form of their alkali or ammonium salts with non-oxidizing mineral acids and/or organic acids or mixtures thereof, wherein per 1 part by weight of dyestuff, preferably 2 to 10 parts by weight of concentrated acid and 2 to 10 parts by weight of diluting agent such as water or water-soluble organic solvents are used. As acids there are used, for example, hydrochloric acid, hydrobromic acid, phosphoric acid, sulfuric acid, acetic acid, trichloroacetic acid of formic acid. It is particularly advantageous to heat the solution with hydrochloric acid at a temperature ranging from about 90° C. to 110° C. If the starting dyestuffs containing the thiosulfuric acid groups are not completely soluble in a purely aqueous solution or if, in the course of the acid treatment, starting compounds which are not completely split up precipitate in the form of difficultly soluble intermediates, it is suitable to add dissolving intermediaries such as methanol, ethanol or isopropanol.

The water-insoluble dyestuffs obtained by the process of this invention are, generally, obtained in fine crystalline form. After cleavage they are filtered off with suction, washed with water and dried.

The water-insoluble dyestuffs obtained by the process of this invention can be used in industry in various fields of application. Thus they can be used as valuable pigment dyestuffs. They are preferably used, however, for dyeing cellulose materials.

We have found that dyeings fast to wet processing can be obtained on cellulose materials by dyeing, padding or printing in a manner such that the water-insoluble dyestuffs of this invention are applied to the cellulose material in the presence of inorganic bases or of substances developing alkali in the hot and that, if desired, during or after the application of the dyestuffs mentioned the cellulose material is subjected to a thermal treatment.

The dyeing of the cellulose materials may be carried out in a long liquor process wherein dilute solutions containing advantageously 0.1 to 0.2% of the dyestuffs in dilute sodium or potassium hydroxide of preferably 0.1 to 2% strength act on the cellulose for a considerable time, for example for one hour at elevated temperatures, preferably at 60° to 100° C.

The dyestuffs can, however, also be fixed on cellulose fabrics in an advantageous manner by continuous padding-steaming or padding-drying processes. It is suitable, in many cases to add to the alkaline padding liquors, substances having a good penetrating power, for example urea. According to this dyeing method the dyestuffs can often be fixed under very mild conditions, for example by drying at 50° C.

The printing pastes are prepared as usual by adding a thickener agent such as starch, tragacanth thickening, cellulose ether or starch ether. Instead of sodium or potassium hydroxide solution they may also contain sodium carbonate or substances giving an alkaline reaction only in the heat, such as sodium bicarbonate or tertiary sodium phosphate. As substances giving an alkaline reaction there may also be used organic bases, such as pyridine or quinoline.

After the usual printing process the fixation of the dyestuff may be carried out either by a neutral steaming process, preferably at a temperature ranging from 100° C. to 125° C. or by drying at an elevated temperature ranging from about 150° C. to 220° C., preferably at 180° C. Depending on the kind of dyestuff used and depending on the composition of the printing paste, however, a fixation is already possible, in many cases, under considerably milder conditions, for example by drying at a temperature ranging from 20° C. to 60° C.

The dyeings and prints obtained by the process of this invention are distinguished by a very good fastness to wet processing. The process is suitable for dyeing and printing any fibrous materials made of natural or regenerated cellulose, preferably, however, for printing cellulose.

The following examples serve to illustrate the invention but they are not intended to limit it thereto, the parts being by weight unless otherwise stated and the relationship of parts by weight to parts by volume being the same as that of the kilogram to the liter.

*Example 1*

50 parts of the product obtained by condensing 1 mol of copper-phthalocyanine-trisulfochloride with 3 mols of 3-aminobenzyl-thiosulfuric acid were dissolved in 500 parts by volume of water and, after the addition of 300 parts by volume of concentrated hydrochloric acid the solution was heated to boiling temperature for two hours. After cooling the precipitated dyestuff was filtered off, washed with water and dried. 29 parts of a loose blue powder were obtained which readily dissolved in dilute aqueous alkali to give a blue solution.

*Example 2*

Into a mixture at 80° C. of 200 parts by volume of water and 200 parts by volume of concentrated hydrochloric acid 100 parts of the product obtained by condensing 1 mol of copper-phthalocyanine-trisulfochloride with 3 mols of aminoethyl-thiosulfuric acid were introduced. The mixture was heated for 30 minutes at 100° C., cooled, filtered off and washed with water. After drying, 75 parts of dyestuff were obtained in the form of a loose blue powder which readily dissolved in dilute sodium hydroxide to give a blue solution.

*Example 3*

33 parts of the product obtained by coupling 3-aminobenzylthiosulfuric acid with 3-(2′,3′-hydroxynaphthoylamino)-benzylthiosulfuric acid were heated for 2 hours under reflux with 200 parts by volume of isopropanol and 200 parts by volume of concentrated hydrochloric acid. Subsequently, the mixture was heated under reflux for 3 hours while gradually diluting with 500 parts by volume of water. After cooling, the solution was filtered off and washed with water; after drying, 22 parts of a water-insoluble dyestuff were obtained in the form of a loose red powder which dissolved in aqueous alkalies to give a red solution.

*Example 4*

Into a mixture at 80° C. of 100 parts by volume of water and 100 parts by volume of concentrated hydrochloric acid there were introduced 30 parts of the dyestuff having the following formula:

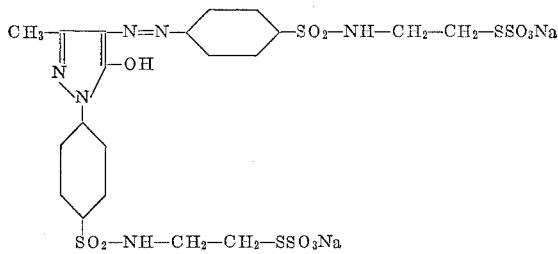

and the mixture was stirred for 20 minutes at 90° C. After cooling, the cleavage product was filtered off, washed with water and dried. A water-insoluble yellow dyestuff was obtained which dissolved in dilute sodium hydroxide to give a yellow solution.

*Example 5*

44 parts of the product obtained by coupling 4-aminobenzoylamino-β-ethyl-thiosulfuric acid with 4-(2′,3′-hydroxynaphthoylamino)-benzoylamino-β-ethyl-thiosulfuric acid were heated for two hours under reflux with 200 parts by volume of concentrated hydrochloric acid and 200 parts by volume of isopropanol. The reaction mixture was diluted with water to 800 parts by volume and heated for 2 hours to boiling temperature; after cooling, it was filtered off, washed with water and dried. The water insoluble dyestuff was obtained in the form of a red powder which dissolved in dilute alkalies to give a red solution.

*Example 6*

105 parts of the product obtained by condensing copper-phthalocyanine-trisulfochloride with methylaminoethyl-thiosulfuric acid were dissolved in 200 parts by volume of water and 300 parts by volume of methanol. After the addition of 500 parts by volume of concentrated hydrochloric acid the solution was heated for one hour to 70° C. After cooling, the cleavage product was filtered off and washed with water. 60 parts of a blue alkali-soluble powder were obtained.

*Example 7*

10 parts of the product obtained by coupling 2 mols of 3-amino-benzenesulfonylamino-β-ethyl-thiosulfuric acid with 1 mol of 1,5-di-(acetoacetylamino)-2,4-dimethoxybenzene were dissolved in 200 parts by volume of water and, after the addition of a mixture of 30 parts by volume of concentrated sulfuric acid and 70 parts by volume of water the solution was stirred for four hours at 90° C. After cooling, the cleavage product formed was filtered off with suction and washed with water. 6.4 parts of a yellow powder were obtained which dissolved clearly in dilute sodium hydroxide. It is very suitable for dyeing cotton.

*Example 8*

10 parts of the dyestuff having the formula

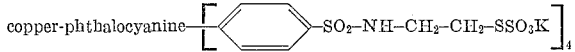

were dissolved in 150 parts by volume of water and heated for 30 minutes at 90° C. with 150 parts by volume of concentrated hydrochloric acid. After cooling, the water-insoluble dyestuff was filtered off with suction and washed with water. 6 parts of a green powder were obtained which easily dissolved in dilute sodium hydroxide to give a green solution. It is very suitable for dyeing cotton.

*Example 9*

20 parts of the product obtained by condensing 1 mol of copper-phthalocyanine-trisulfochloride with 3 mols of 4-aminophenoxy-β-ethyl-thiosulfuric acid were dissolved in a mixture of 200 parts by volume of water and 50 parts by volume of formic acid and, after the addition of 100 parts by volume of concentrated hydrochloric acid, the solution was heated for one hour at 80° C. After cooling, the cleavage product was filtered off and washed with water. It easily dissolved in dilute sodium hydroxide to give a green blue solution. It is very suitable for dyeing cotton.

The water-insoluble dyestuff obtained from the product obtained by condensing copper-phthalocyanine-trisulfochloride with 4 amino-benzoylamino-β-ethyl-thiosulfuric acid possesses similar properties.

*Example 10*

20 parts of the product obtained by condensing 1 mol of copper-phthalocyanine-trisulfochloride with 3 mols of 3-amino-4-methoxybenzyl-thiosulfuric acid were dissolved in 400 parts by volume of water and, after the addition of 100 parts by volume of concentrated hydrochloric acid the solution was heated for two hours to a temperature of 80° C. After cooling, the water-insoluble dyestuff was filtered off, washed with water and dried. 14 parts of a blue green powder were obtained which easily dissolved in dilute sodium hydroxide. It is very suitable for dyeing cotton.

In the same manner, the product obtained by condensing 1 mol of copper-phthalocyanine-trisulfochloride with 3 mols of 3-aminophenyl-thiosulfuric acid can be converted into a water-insoluble dyestuff.

*Example 11*

10 parts of cotton were treated for 1 hour at a temperature of 80° C. with 300 parts of an alkaline aqueous solution containing 0.12% of the dyestuff prepared as described in Example 1. After rinsing, soaping and drying a green blue dyeing having a very good fastness to light and to wet processing was obtained.

5 parts of the same dyestuff were mixed with 50 parts of urea and dissolved with 300 parts by volume of hot water and 5 parts of sodium hydroxide of 32.5% strength. After cooling to room temperature, this solution was mixed with 500 parts of a neutral sodium alginate thickening paste of 4% strength. By the addition of thickening paste and water the printing color was then made up to 1000 parts and stirred. It was used for printing cotton or staple fiber in the usual manner.

The print was dried at 60° C., cold-rinsed and then hot-rinsed for 5 minutes and subsequently soaped at boiling temperature in the usual manner and rinsed once more. In this way a blue green print was obtained which possessed good properties of fastness.

Prints having the same fastness properties were obtained by dry hot-treating for 2 minutes at 180° C. or by steaming for 5 to 10 minutes, instead of by drying at 60° C., and by subsequently rinsing and soaping the prints in the manner described above.

*Example 12*

A cotton fabric was padded on the foulard (squeezing effect: 80%) with a solution containing per 1000 parts by volume 100 parts of urea, 15 parts by volume of concentrated sodium hydroxide solution and 10 parts of the cleavage product prepared as described in Example 2. The whole was dried at 110° C., hot-rinsed, soaped, cold-rinsed and dried. The blue dyeing so obtained possessed a good fastness to light and to washing.

20 parts of the same dyestuff were mixed with 100 parts of urea and pasted up with 100 parts of pyridine. To this mixture 250 parts by volume of hot water and 500 parts of a neutral sodium alginate thickening paste of 4% strength were added. With water or thickening paste the printing paste was made up to 1000 parts while stirring well. After drying, cotton or staple fiber printed with this paste was steamed for 5 to 10 minutes until neutral. After cold- and hot-rinsing and soaping at boiling temperature, light blue prints were obtained which possessed a good fastness to wet processing. The same results were obtained by using quinoline instead of pyridine.

Prints of good fastness properties were equally obtained by adding instead of 100 parts of pyridine 40 parts of tertiary sodium phosphate or 40 parts of calcined sodium carbonate or 80 parts of sodium bicarbonate.

*Example 13*

10 parts of the dyestuff prepared as described in Example 3, 100 parts of urea and 15 parts by volume of concentrated sodium hydroxide solution were dissolved in about 800 parts by volume of water. With this solution a cotton fabric was padded on the foulard (squeezing effect: 80%). The humid padding was steamed for 2 minutes, hot-rinsed, soaped, cold-rinsed and dried. A red dyeing being fast to washing was obtained.

10 parts of the same dyestuff were stirred with 50 parts of urea, 250 parts by volume of hot water and 20 parts of sodium hydroxide solution of 32% strength. 500 parts of neutral sodium alginate thickening paste of 4% strength were added thereto and this mixture was made up to 1000 parts by adding water. After thoroughly stirring, this printing paste was printed on cotton or staple fiber in the usual manner. The subsequent drying was followed by steaming for 10 minutes until neutral. After well cold- and hot-rinsing, the print was soaped at boiling temperature and rinsed once more. A bright scarlet red print possessing a good fastness to wet processing was obtained.

Instead of fixing the print by steaming until neutral, it may also be fixed by drying as described in Example 1.

*Example 14*

A cotton fabric was padded on the foulard (squeezing effect: 80%) with a dyestuff solution containing per 1000 parts by volume 20 parts of the dyestuff prepared as described in Example 4, 20 parts by volume of concentrated sodium hydroxide solution and 100 parts of urea. After drying at 100° C., steaming for 5 to 10 minutes on the Mather-Platt, hot-rinsing, soaping and cold-rinsing, a golden yellow dyeing possessing a good fastness to washing was obtained.

*Example 15*

20 parts of the dyestuff prepared as described in Example 5 were stirred with 50 parts of urea and 300 parts by volume of water; then 20 parts of sodium hydroxide solution of 32.5% strength were added. To this solution 500 parts of neutral sodium alginate thickening paste of 4% strength were added and the mixture was made up to 1000 parts with water while well stirring. With this printing color cotton and staple fiber were printed, in the usual manner, and subsequently dried and steamed for 5 minutes until neutral. After thoroughly cold- and hot-rinsing, soaping at boiling temperature and rinsing once more, a brown red print possessing a good fastness to wet processing was obtained. The print may also be fixed by drying as it is described in Example 1.

*Example 16*

20 parts of the dyestuff prepared as described in Example 6 were mixed with 50 parts of urea and dissolved with 300 parts by volume of hot water and 20 parts of sodium hydroxide solution of 32.5% strength. After cooling to room temperature, 400 parts of neutral sodium alginate thickening paste of 4% strength were added to the above solution. This mixture was made up to 1000 parts by adding water while stirring well. The printing color was printed on cotton or staple fiber in the usual manner, dried and steamed for 5 minutes until neutral. After cold- and hot-rinsing and soaping at boiling temperature, a turquoise blue print possessing a good fastness to wet processing was obtained.

The same result was obtained by eliminating the steaming process and by only aftertreating the printed and dried fabric in hot water.

The cleavage product of the dyestuff having the formula

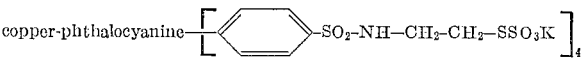

as well as the cleavage products of the products obtained by condensing copper - phthalocyanine - trisulfochloride with 4-amino-phenoxy-β-ethyl-thiosulfuric acid or with 3-amino-4-methoxy-benzyl-thiosulfuric acid can be printed on cotton or staple fiber quite analogously.

We claim:

1. A process for preparing a water-insoluble dyestuff, which comprises heating, to a temperature between about 40° C. and 110° C., a water-soluble dyestuff selected from the group consisting of dyestuffs of the formula

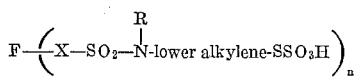

and the alkali-metal and ammonium salts thereof, wherein F represents a member selected from the group consisting of copper phthalocyanine and nickel phthalocyanine, X represents a member selected from the group consisting of a direct linkage and phenylene, R represents a member selected from the group consisting of hydrogen and lower alkyl, and $n$ represents a number from 2 to 4, in an aqueous solution with a non-oxidizing acid selected from the group consisting of inorganic acids, organic acids and mixtures thereof.

2. A process for preparing a water-insoluble dyestuff which comprises heating, to a temperature between about 90° C. and 110° C., a water-soluble dyestuff selected from the group consisting of dyestuffs of the formula

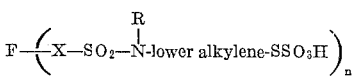

and the alkali-metal and ammonium salts thereof, wherein F represents a member selected from the group consisting of copper phthalocyanine and nickel phthalocyanine, X represents a member selected from the group consisting of a direct linkage and phenylene, R represents a member selected from the group consisting of hydrogen and lower alkyl, and $n$ represents a number from 2 to 4, in an aqueous solution with hydrochloric acid.

3. The water-insoluble dyestuff prepared by reacting, in an aqueous solution with a non-oxidizing acid selected from the group consisting of inorganic acids, organic acids and mixtures thereof at a temperature between about 40° C. and 110° C., a dyestuff of the formula

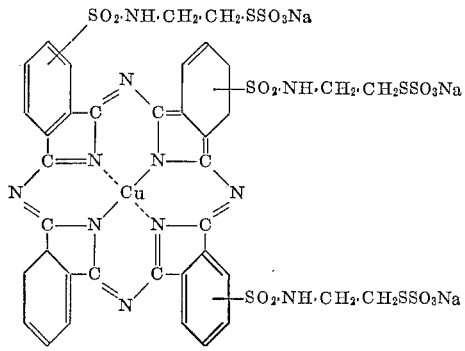

4. The water-insoluble dyestuff prepared by reacting, in an aqueous solution with a non-oxidizing acid selected from the group consisting of inorganic acids, organic acids and mixtures thereof at a temperature between about 40° C. and 110° C., a dyestuff of the formula

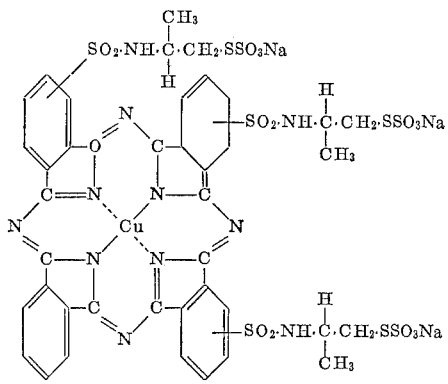

5. The water-insoluble dyestuff prepared by reacting, in an aqueous solution with a non-oxidizing acid selected from the group consisting of inorganic acids, organic acids and mixtures thereof at a temperature between about 40° C. and 110° C., a dyestuff of the formula

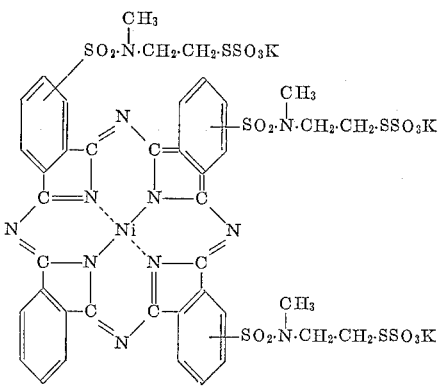

6. The water-insoluble dyestuff prepared by reacting, in an aqueous solution with a non-oxidizing acid selected from the group consisting of inorganic acids, organic acids and mixtures thereof at a temperature between about 40° C. and 110° C., a dyestuff of the formula

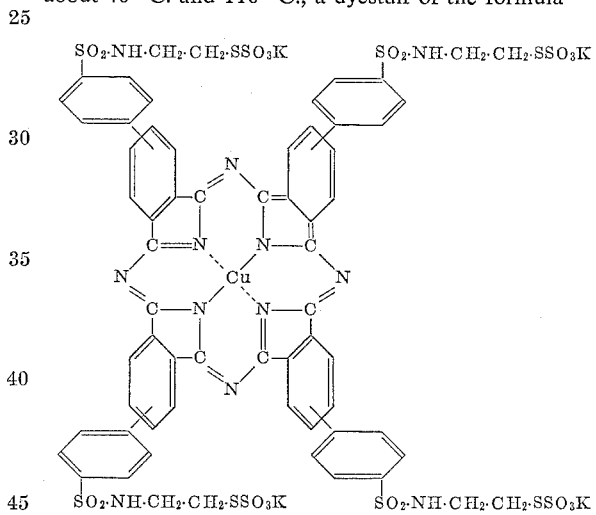

7. A water-insoluble dyestuff prepared by reacting, at a temperature between about 40° C. and 110° C., a water-soluble dyestuff selected from the group consisting of dyestuffs of the formula

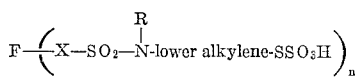

and the alkali-metal and ammonium salts thereof, wherein F represents a member selected from the group consisting of copper phthalocyanine and nickel phthalocyanine, X represents a member selected from the group consisting of a direct linkage and phenylene, R represents a member selected from the group consisting of hydrogen and lower alkyl, and $n$ represents a number from 2 to 4, in an aqueous solution with a non-oxidizing acid selected from the group consisting of inorganic acids, organic acids and mixtures thereof.

References Cited by the Examiner
UNITED STATES PATENTS

| | | | |
|---|---|---|---|
| 2,245,971 | 6/1941 | Felix et al. | 260—205 |
| 2,283,326 | 5/1942 | Felix et al. | 260—163 |
| 2,342,662 | 2/1944 | Haddock | 260—314.5 |
| 2,615,783 | 10/1952 | Haefele et al. | 260—314.5 |

(Other references on following page)

UNITED STATES PATENTS

| | | | |
|---|---|---|---|
| 2,657,202 | 10/1953 | Moser | 260—158 |
| 2,670,265 | 2/1954 | Heyna et al. | 8—49 |
| 2,686,179 | 8/1954 | Gunst | 260—158 |
| 2,784,204 | 3/1957 | Heyna et al. | 260—163 |
| 2,832,789 | 4/1958 | Zerweck et al. | 260—314.5 |
| 2,880,177 | 3/1959 | Lyons et al. | 260—161 |
| 2,995,412 | 8/1961 | Kleb | 8—54.2 |
| 3,000,762 | 9/1961 | Tesoro | 260—314.5 |
| 3,007,762 | 11/1961 | Wegmann | 8—54.2 |
| 3,023,164 | 2/1962 | Lawton et al. | 260—314.5 |
| 3,088,790 | 5/1963 | Schultheis et al. | 260—314.5 |

FOREIGN PATENTS

| | | |
|---|---|---|
| 158,864 | 6/1940 | Austria. |
| 490,945 | 8/1938 | Great Britain. |
| 779,781 | 7/1957 | Great Briain. |

OTHER REFERENCES

Weiss et al.: "J. Am. Chem. Soc," vol. 72, pp. 1687–1689 (1950).

WALTER A. MODANCE, Primary Examiner.

CHARLES B. PARKER, LEON ZITVER, NICHOLAS S. RIZZO, Examiners.